Figure 1:
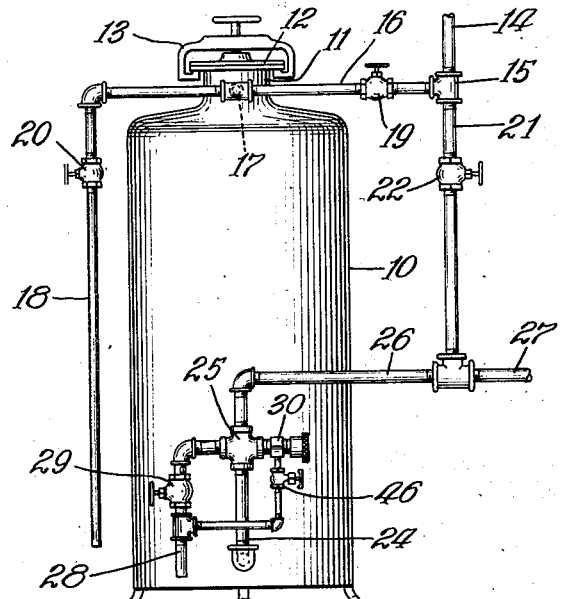

Aug. 11, 1942.  K. SLIDELL  2,292,801

WATER SOFTENING APPARATUS

Filed July 8, 1939

Inventor:
Kemper Slidell
By Tesch and Darbo
Attys.

Patented Aug. 11, 1942

2,292,801

UNITED STATES PATENT OFFICE 2,292,801

WATER SOFTENING APPARATUS

Kemper Slidell, Madison, Wis., assignor to Research Products Corporation, Madison, Wis., a corporation of Wisconsin Application July 8, 1939, Serial No. 283,419

8 Claims. (Cl. 210—24)

This invention relates to water softening apparatus, and particularly to an improvement in semi-automatic water softening apparatus in which the regenerating operation is initiated manually and the subsequent steps of flushing away the regenerating brine solution and returning the apparatus to normal softening operation are carried out automatically. The water softening apparatus has associated with it a conduit system for controlling the flow of the regenerating brine solution and the flushing water, and a dissolvable member is placed in this conduit system and functions in such a manner that it controls a valve arrangement whereby the spent brine is caused to flow to waste until the brine has all been flushed out of the softening apparatus, and then the conduit leading to the waste is automatically caused to be closed, and the system is arranged to deliver soft water to the service outlets.

The dissolvable member progressively dissolves as the flushing water flows to waste. The time within which the spent brine is all flushed away is dependent upon the rate of flow of flushing water and the quantity of salt used for regeneration. The rate of flow of flushing water depends upon the water pressure upon the system and the amount of salt used depends upon the size, or water softening capacity, of the installation. Water softening apparatus are subjected to varying water pressures in different localities. As a result the dissolving time of the dissolvable member and the rate of flow of the flushing water must be correlated for each different condition of water pressure and installation capacity, so as to cause the flow to waste to be stopped when the spent brine is all flushed away.

It is the object of the present invention to provide means for readily correlating the rate of flushing the spent brine from the apparatus with the dissolving time of the dissolvable member whereby proper flushing operation will be obtained under different water pressure conditions and with installations of different capacities.

Figure 2:
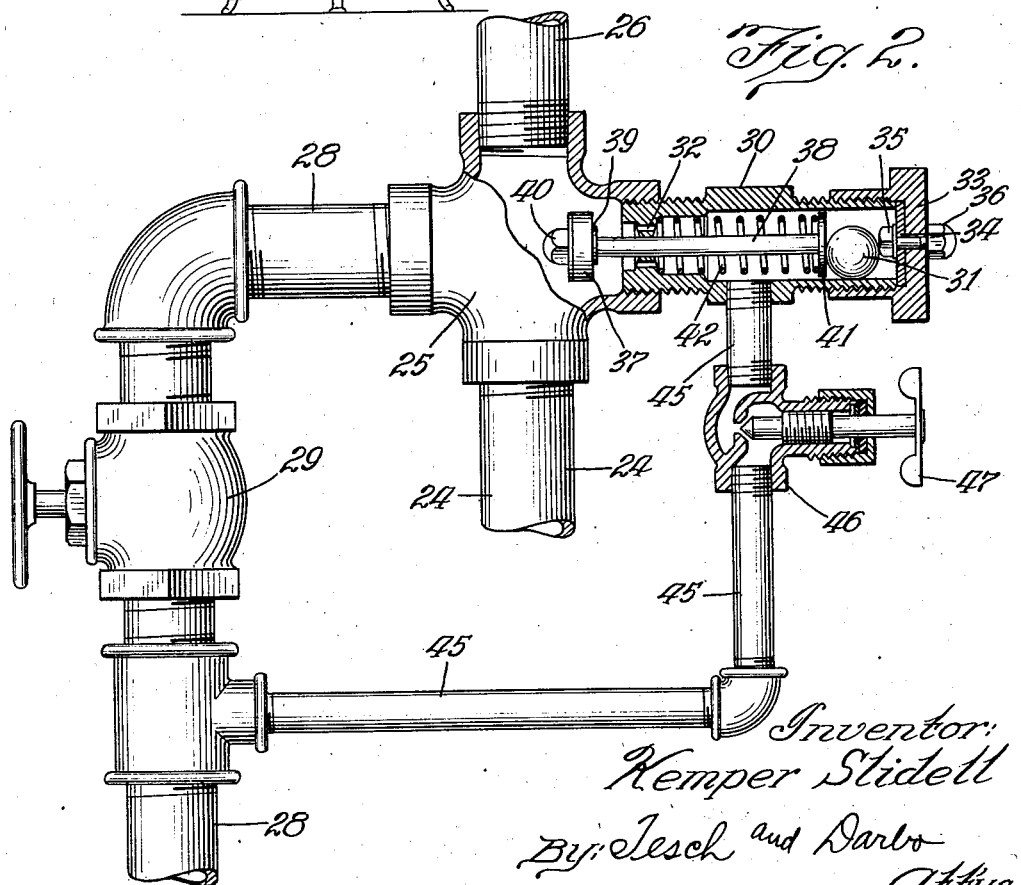

In the drawing:

Fig. 1 is a plan view of a specific embodiment of the water softening apparatus of the present invention, and Fig. 2 is an enlarged, detail view, partly in section, of the conduit system for flushing liquid including the regulating means of this invention.

The apparatus consists of a tank 10 containing base exchange water softening material (not shown). Tank 10 has a relatively wide neck 11 at the top which provides an opening for introduction of the regenerating salt. The opening is closed by means of a cover 12 which is normally held tightly in position to close the opening of the tank. Any suitable means may be used for holding the cover in position, such as the clamping means shown at 13.

The conduit system for the apparatus consists of a pipe 14 which is connected to the hard water supply, and which divides at the point 15, one of the pipes 16 extending from this point laterally to a point adjacent the neck 11 of the tank, at which point it is connected to the short pipe 17 which communicates with the interior of the tank through an opening in the neck 11. The pipe 16 continues beyond the junction with pipe 17 to provide a waste pipe 18. A valve 19 is inserted in pipe 16, and a similar valve 20 is inserted in waste pipe 18.

Pipe 24 is connected to the bottom of the softening tank and extends upwardly to a cross-member 25. One leg, or branch, of cross-member 25 is connected to pipe 26, which, in turn, is connected to the service pipe 27, which communicates with the service outlets to be supplied with soft water. A second branch pipe 21 leading from raw water pipe 14 extends downwardly and is connected to cross-member 25 by way of pipe 26. A valve 22 is inserted in pipe 21.

A second outlet, or branch, of cross-member 25 is connected to a waste pipe 28. A valve 29 is inserted in this pipe. A third outlet, or branch, of cross-member 25 is connected to a conduit section or hollow chamber 30, which is adapted to contain the dissolvable member 31 therein. Member 31 may be an ordinary hard candy ball, such as may be purchased at most stores where candy is sold. The end of the chamber member 30 which is connected to the cross-member 25 is substantially closed, but has openings 32 therein for the passage of water. The end of chamber member 30 remote from cross-member 25 is closed by a threaded cap member 33 which has a gasket 34 therein adapted to engage the end of the chamber member 30 and form a water-tight seal. A threaded bolt 35 passes through the gasket 34 and cap 33 and is fastened in place by a nut 36.

A valve member 37 is adapted to make engagement with the inner end of chamber member 30 to close the same against the flow of water into the chamber member 30. The valve member 37 is mounted upon the threaded end of a rod 38 which passes through an opening in the substantially closed end of the chamber member 30, and is fastened in place between flange 39 and threaded nut 40. The end of rod 38 located interiorly of chamber member 30 has a flange 41 thereon, and a compression spring 42 is arranged surrounding rod 38 and extending between flange 41 and the substantially closed end of the chamber member 30. Spring 42 urges valve member 37 to the closed position. The dissolvable member 31 is arranged between the flange 41 and the cap member 33 and holds the valve member 37 in the open position. A conduit 45 communicates with an intermediate portion of the interior of chamber member 30 and is connected to the waste pipe 28 between valve 29 and the discharge end of said pipe 28. A needle valve 46 is connected in pipe 45, and is readily adjustable by means of valve handle 47 to regulate the rate of flow of liquid within pipe 45, which in turn regulates the rate and amount of water passing through condit 30 in which is located the dissolvable member 31.

The operation of the water softening apparatus is as follows. During normal softening, valves 20, 22 and 29 are closed and the valve member 37 is also closed. The remainder of the valves are open. Raw hard water enters by way of supply pipe 14, pipes 16 and 17 into the top of the softening tank 10, passes downwardly through the tank and the water softening material therein and out at the bottom, and passes through pipes 24, 26 and 27 to the soft water service.

After the water softening material has become exhausted and regeneration is required, it may be desired to backwash the apparatus preliminary to the actual regeneration, and for this purpose valve 19 is closed and valves 20 and 22 are opened. Valve 29 is allowed to remain in the closed position. Raw water flows from supply pipe 14 downwardly through pipes 21, 26 and 24 into the bottom of the softening tank, upwardly through the tank and out at the top through pipes 17 and 18 to the waste. Valve 20 or valve 22 is adjusted to regulate the flow so as to backwash the water softening material properly without carrying it out of the tank 10.

After the sediment has been flushed from the tank and the bed properly loosened and graded by this upwash, the apparatus is next regenerated. For this operation, valve 22 is closed and valve 19 is allowed to remain in the closed position, thereby completely shutting off the raw water supply to the softening tank 10. The clamping member 13 is released and cover 12 is removed from the neck 11 of the softening tank 10. Valve 29 is opened and sufficient water is allowed to drain to waste through pipe 28 to permit the introduction of the regenerating salt into the top of tank 10. After this amount of water has been drained away, valve 29 is closed, and sufficient salt to accomplish the regeneration is introduced through the opened top of the tank. Valve 20 is then closed and valve 19 is opened sufficiently to fill the tank 10 with water and then closed and the cover 12 is replaced and clamped tightly in position by means of clamping member 13. The cap 33 is then removed from the chamber member 30 and the dissolvable member 31 is placed in the cap 33 and the latter replaced upon chamber member 30 and screwed tightly into the closed position, thereby causing valve 37 to be opened, as shown in Fig. 2. Valve 19 is then opened and the regenerating operation is thereby begun. Valve 46 is open to a position permitting flow at the proper rate, as will be explained hereinafter.

The water passing downwardly from pipe 17 into the softening tank 10 dissolves the salt. The resulting brine solution regenerates the water softening material, and the spent regenerating solution passes out of tank 10 by way of pipe 24, open valve member 37, chamber member 30, pipe 45, needle valve 46 and waste pipe 28 and thence to the waste.

The spent regenerating solution passes through chamber member 30 and circulates about the dissolvable member 31 and causes the latter to become dissolved. After the member 31 is reduced in size a sufficient amount, valve member 37 moves to the closed position. The apparatus is arranged so that at this time member 31 is small enough to move into the space between the head of bolt 35 and the wall of chamber member 30. As a result the valve 37 closes quickly with a snap. The time of dissolution of member 31 to the point where valve member 37 closes should be such that the water has dissolved all of the salt, the spent regenerating solution has all been flushed out of the tank, and the water passing through the softening tank outlet pipe 25 is soft and suitable for use.

In accordance with the present invention means are provided for arranging that the valve 37 closes at the proper time with respect to the flushing of the spent brine from the tank 10. This means comprises valve 46. It has been discovered that when the dissolvable member is placed in the conduit for the flushing liquid but out of the direct path of the current of flowing liquid, particularly when the circulation about the dissolvable member is restricted, as it is by flange 41, the rate of dissolution is fairly uniform for different rates of flow of the liquid. In such an arrangement the dissolvable member is a timing means and when it has been arranged so as to cause the closing of valve 37 after the desired flushing period has elapsed the valve 46 may be adjusted to provide the proper rate of flow to secure the rinsing away of spent brine by the time the valve 37 closes.

This is an important function because the pressure of the hard water supply varies widely in different localities and consequently the flow of flushing liquid varies also. In addition, in installations of different size and capacity, different amounts of salt are required for regeneration and different amounts of flushing liquid for rinsing, so that the flushing time and rate must be properly correlated for each size installation. A dissolvable member has been utilized heretofore to stop the flow of flushing liquid (Shetler United States Patent 1,964,302). Various expedients were resorted to, prior to the introduction of my improved regulating means, to secure the proper correlation between the dissolving time and the flushing time. An arrangement similar to the assembled chamber member 30, cap 33, and the parts therein was used and one expedient was to adjust the position of the valve 37 upon the end portion of rod 38 by means of threaded nuts on opposite sides of the valve. This regulated the closing of the valve with respect to the stage of dissolution of member 31. Another was to cut notches into the edge of the flange 41 to regulate the circulation of liquid about the dissolvable member. This varied the rate of dissolution of member 31. These adjustments were required to be made on the job. Each adjustment of valve member 37 required that the chamber member 30 be disconnected from the system. Cutting of the notches in flange 41 required that the chamber member be disconnected and disassembled. A further expedient was to provide an adjustable member in the place of bolt 35. These adjustments were tedious and as a result, satisfactory adjustment of the flushing period was difficult and generally was not accomplished satisfactorily. Furthermore, the adjustment difficulties caused the cost of the equipment to be high, and often the installation cost was excessive.

With my improved regulating means, it is simple and inexpensive to adjust the apparatus to provide the proper flushing period. When an apparatus is installed for the first time in a particular locality, several trial adjustments of valve 46 will be required to secure the proper flushing rate. After that, valve 46 may be allowed to remain in the same position. In fact, the valve handle may be removed to prevent the setting from being disturbed. Subsequent operation, including regeneration of the water softener does not require that the setting of valve 46 be disturbed. After an adjustment has been obtained for a particular water flow rate and pressure condition, this same adjustment may be used for other installations in which the same conditions obtain. The same is true for each different size of installation. The chamber member 30 and the cap member 33 with the parts therein may be sold as an assembled unit, and instead of requiring a stock of a large number of different units, adapted for different water pressure conditions and sizes of installation, a stock of only one kind of unit is required. My improved regulating means, therefore, provides important advantages in this type of water softening apparatus.

It is seen that this type of water softening apparatus provides semi-automatic regeneration, in that after the salt has been introduced into the softening tank and the flow of regenerating solution has been initiated, the remainder of regenerating operation is automatic in that after all of the spent brine solution has been flushed away the dissolvable member has been reduced in size so that the valve 37 automatically closes and stops the flow to waste and thus places the apparatus in condition for normal softening operation. This type of apparatus is particularly suitable for a plan of operation of domestic water softeners in which the regenerating and servicing are performed by a central agency and not by the user. All that is required is that a few minutes be devoted to initiating the regenerating operation, after which the attendant may leave and pass to the next installation.

The bed backwashing operation described heretofore may be dispensed with, or it may be performed only once in several regenerating operations, depending upon the amount of sediment carried by the raw water.

While a single embodiment has been used to illustrate the invention, various modifications thereof are possible. For example, instead of the dissolvable member 31, other timing means may be used, such as a clock mechanism. Valve 46 may be of a type other than a needle valve. In the apparatus illustrated, the water flow in the conduit system is controlled by a number of individual valves. This may also be accomplished by means of a single, multiple-port valve such as is disclosed in the Shetler Patent No. 1,964,302 mentioned heretofore. The dissolvable member may be disposed out of the direct path of the current of flushing as disclosed heretofore and arranged to operate the multiple-port valve as disclosed in said patent. Other modifications may be made within the scope of the invention.

I claim:

1. In a water softening apparatus having a softening tank, means for introducing brine solution into said tank and a conduit system for flushing spent brine solution from said tank to the waste, means for automatically stopping the flow of flushing liquid to waste after the spent brine is flushed from said tank, comprising means forming a chamber in said conduit system, said chamber having a compartment which is out of the path of said flushing liquid and is in controlled communication with the remainder of said chamber, said compartment being adapted to receive a water-dissolvable member therein, a stop valve in said conduit system and adapted to be held in the open position by said dissolvable member, means urging said stop valve to the closed position and adapted to move said stop valve to the closed position upon said dissolvable member becoming dissolved, and an adjustable flow-regulating valve in the path of said flushing liquid.

2. The construction of claim 1 in which the adjustable flow-regulating valve is a needle valve.

3. In a water softening apparatus having means for introducing brine solution and a conduit for flushing spent brine solution to the waste, means for automatically stopping the flow of flushing liquid after the spent brine is flushed from said apparatus comprising means forming a chamber, said chamber being arranged outside the path of liquid in said conduit, means providing communication between said chamber and said conduit, said chamber being adapted to receive a water-dissolvable member therein, a stop valve in said conduit and adapted to be held in the open position by said dissolvable member, means urging said stop valve to the closed position and adapted to move said stop valve to the closed position upon said dissolvable member becoming dissolved, and an adjustable flow-regulating valve in the path of said flushing liquid.

4. In a water softening apparatus having a softening tank and means for introducing brine solution into said tank and a conduit system for flushing spent brine solution from said tank to the waste, means for automatically stopping the flow of flushing liquid to waste after the spent brine is flushed from the tank, comprising means forming a chamber in said conduit system, a partition dividing said chamber into two compartments, the second of which is out of the direct path of flow of said flushing liquid, said partition being constructed and arranged to provide restricted communication between said compartments, said second compartment being adapted to receive a water-dissolvable member therein, a stop valve in said conduit and adapted to be held in the open position by said dissolvable member, means urging said stop valve to the closed position and adapted to move said stop valve to the closed position upon said dissolvable member becoming dissolved, and an adjustable flow-regulating valve in said conduit system.

5. In a water softening apparatus having a softening tank and means for introducing brine solution into said tank and a conduit for flushing spent brine solution from said tank to the waste, means for automatically stopping the flow of flushing liquid to waste after the spent brine is flushed from the tank, comprising means forming a chamber adjacent said conduit, the side wall of said conduit having an opening therein between said conduit and said chamber providing restricted circulation of liquid in the interior of said chamber, said chamber being adapted to receive a water-dissolvable member therein, a stop valve in said conduit and adapted to be held in the open position by said dissolvable member, means urging said stop valve to the closed position and adapted to move said stop valve to the closed position upon said dissolvable member becoming dissolved, and an adjustable flow-regulating valve in said conduit.

6. The apparatus of claim 5 in which the chamber containing the dissolvable member is located in the down-stream direction from the stop valve.

7. The combination with a liquid-conducting conduit of means forming a chamber adjacent said conduit, the wall of said conduit having an opening therein between said conduit and said chamber and providing restricted circulation of liquid in the interior of said chamber, said chamber being adapted to receive a water-dissolvable member therein, a stop valve in said conduit and adapted to be held in the open position by said dissolvable member, means urging said stop valve to the closed position and adapted to move said stop valve to the closed position upon said dissolvable member becoming dissolved, and an adjustable flow-regulating valve in said conduit for regulating the rate of flow of said liquid.

8. A valve control mechanism for a liquid-conducting conduit, comprising means forming a chamber adjacent said conduit, the wall of said conduit having an opening therein providing restricted circulation of liquid in the interior of said chamber, said chamber being adapted to receive a water-dissolvable member therein, a stop valve in said conduit and adapted to be held in the open position by said dissolvable member, means urging said stop valve to the closed position and adapted to move said stop valve to the closed position upon said dissolvable member becoming dissolved, and an adjustable flow-regulating valve in said conduit system for regulating the rate of flow of said liquid.

KEMPER SLIDELL.